US011224978B2

United States Patent
Ayuzawa (10) Patent No.: US 11,224,978 B2
(45) Date of Patent: Jan. 18, 2022

(54) ROBOT

(71) Applicant: NIDEC CORPORATION, Kyoto (JP)

(72) Inventor: Yuu Ayuzawa, Nagano (JP)

(73) Assignee: NIDEC CORPORATION, Kyoto (JP)

( * ) Notice: Subject to any disclaimer, the term of this patent is extended or adjusted under 35 U.S.C. 154(b) by 523 days.

(21) Appl. No.: 16/089,388

(22) PCT Filed: Mar. 8, 2017

(86) PCT No.: PCT/JP2017/009124
§ 371 (c)(1),
(2) Date: Sep. 28, 2018

(87) PCT Pub. No.: WO2017/169576
PCT Pub. Date: Oct. 5, 2017

(65) Prior Publication Data
US 2020/0298423 A1 Sep. 24, 2020

(30) Foreign Application Priority Data
Mar. 30, 2016 (JP) .............................. JP2016-067517

(51) Int. Cl.
*B25J 9/10* (2006.01)
*B25J 17/00* (2006.01)
(Continued)

(52) U.S. Cl.
CPC .............. *B25J 17/00* (2013.01); *B25J 9/046* (2013.01); *B25J 9/08* (2013.01); *B25J 9/102* (2013.01); *B25J 9/126* (2013.01); *B25J 13/088* (2013.01)

(58) Field of Classification Search
CPC ...... B25J 19/0004; B25J 17/025; B25J 9/146; B25J 9/046; B25J 9/0009; B25J 17/00;
(Continued)

(56) References Cited

U.S. PATENT DOCUMENTS 5,155,423 A * 10/1992 Karlen ....................... B25J 9/04
  318/568.1
5,293,107 A * 3/1994 Akeel ........................ B25J 9/08
  310/83

(Continued)

FOREIGN PATENT DOCUMENTS

JP   2004174704    6/2004
JP   2015085451    5/2015
(Continued)

OTHER PUBLICATIONS

"International Search Report (Form PCT/ISA/210)" of PCT/JP2017/009124, dated May 16, 2017, with English translation thereof, pp. 1-4.

*Primary Examiner* — Randell J Krug
(74) *Attorney, Agent, or Firm* — JCIPRNET (57) ABSTRACT

Provided is a robot. For example, a joint part of this robot is provided with: a motor; a reduction gear coupled to the motor; an output-side member fixed to the output shaft of the reduction gear; a position detection mechanism for detecting the rotational position of the motor; a circuit board to which the motor and the position detection mechanism are electrically connected; and a case in which the motor, the reduction gear, the position detection mechanism, and the circuit board are housed. The motor and the reduction gear are fixed to the case. A motor driving circuit for driving the motor, a signal transmission circuit for outputting a signal inputted to the circuit board to outside the circuit board, and a connector to which an end of a wiring is connected are mounted to the circuit board.

9 Claims, 4 Drawing Sheets

(51) Int. Cl.
  *B25J 9/04*   (2006.01)
  *B25J 9/08*   (2006.01)
  *B25J 9/12*   (2006.01)
  *B25J 13/08*  (2006.01)

(58) Field of Classification Search
  CPC ... B25J 9/102; B25J 9/126; B25J 9/108; B25J 9/0012; B25J 9/007; B25J 9/1025; B25J 17/0241; F16H 49/001; F16H 25/2454
  See application file for complete search history.

(56) References Cited

U.S. PATENT DOCUMENTS

| | | | | |
|---|---|---|---|---|
| 6,329,731 | B1* | 12/2001 | Arbanas | F16H 57/0416 |
| | | | | 310/52 |
| 7,971,504 | B2* | 7/2011 | Haniya | B25J 19/0029 |
| | | | | 74/490.03 |
| 8,410,732 | B2 | 4/2013 | Kassow et al. | |
| 2013/0255426 | A1* | 10/2013 | Kassow | B25J 18/00 |
| | | | | 74/490.03 |

FOREIGN PATENT DOCUMENTS

| | | |
|---|---|---|
| WO | 2009034789 | 3/2009 |
| WO | 2015004731 | 1/2015 |

\* cited by examiner

ROBOT

CROSS-REFERENCE TO RELATED APPLICATION

This application is a 371 of international application of PCT application serial no. PCT/JP2017/009124, filed on Mar. 8, 2017, which claims the priority benefits of Japan application no. 2016-067517, filed on Mar. 30, 2016. The entirety of each of the above-mentioned patent applications is hereby incorporated by reference herein and made a part of this specification.

TECHNICAL FIELD

The present invention relates to a robot including a joint part and an arm.

BACKGROUND ART

In the related art, a robot including a base, a first arm connected to the base via a first joint part, a second arm connected to a tip side of the first arm via a second joint part, and a wrist part connected to a tip side of the second arm via a third joint part is known (for example, refer to Patent Literature 1). In the robot described in Patent Literature 1, the first arm and the second arm are formed in a cylindrical shape. The first to third joint parts and the wrist part include a motor, a reduction gear connected to the motor, an encoder configured to detect a rotational position of the motor, a circuit board on which the encoder and the like are mounted, and a housing in which the motor, the reduction gear, the encoder, and the circuit board are housed.

In the robot described in Patent Literature 1, the motor disposed in the first to third joint parts and the wrist part is a hollow motor, and the reduction gear is a hollow reduction gear. The motor and the reduction gear are disposed on the same axis. In addition, the first to third joint parts and the wrist part include a hollow shaft that is disposed on the inner circumferential side of the motor which is a hollow motor and the inner circumferential side of the reduction gear which is a hollow reduction gear. The hollow shaft is fixed to an output shaft of the reduction gear. In the robot, a wiring drawn out from the circuit board and the like is drawn through the inner circumferential side of the hollow shaft.

CITATION LIST

Patent Literature

Patent Literature 1

U.S. Pat. No. 8,410,732

SUMMARY OF INVENTION

Technical Problem

In the robot described in Patent Literature 1, generally, a wiring drawn out from the wrist part is drawn to the base through the inner circumferential side of the hollow shaft of the third joint part, the inside of the second arm, the inner circumferential side of the hollow shaft of the second joint part, the inside of the first arm and the inner circumferential side of the hollow shaft of the first joint part in this order, and is connected to the controller of the robot. In addition, in the robot described in Patent Literature 1, generally, a wiring drawn out from the third joint part is drawn to the base through the inside of the second arm, the inner circumferential side of the hollow shaft of the second joint part, the inside of the first arm, and the inner circumferential side of the hollow shaft of the first joint part in this order and is connected to the controller of the robot, a wiring drawn out from the second joint part is drawn to the base through the inside of the first arm and the inner circumferential side of the hollow shaft of the first joint part in this order and is connected to the controller of the robot, and a wiring drawn out from the first joint part is drawn to the base and is connected to the controller of the robot.

That is, in the robot described in Patent Literature 1, the wiring drawn out from the wrist part and the wiring drawn out from the third joint part need to be drawn through the inside of the second arm and the inner circumferential side of the hollow shaft of the second joint part, and the wiring drawn out from the wrist part, the wiring drawn out from the third joint part, and the wiring drawn out from the second joint part need to be drawn through the inside of the first arm and the inner circumferential side of the hollow shaft of the first joint part. Therefore, in the robot described in Patent Literature 1, drawing of the wiring is complicated.

Thus, an objective of the present invention is to provide a robot that can simplify wiring drawing even if a plurality of joint parts are provided.

Solution to Problem

In order to achieve the above objective, a robot of the present invention is a robot including a joint part and an arm, wherein the joint part includes a motor, a reduction gear connected to the motor, an output-side member fixed to an output shaft of the reduction gear, a position detection mechanism configured to detect a rotational position of the motor, a circuit board to which the motor and the position detection mechanism are electrically connected, and a case in which the motor, the reduction gear, the position detection mechanism, and the circuit board are housed, wherein the motor and the reduction gear are fixed to the case, and wherein a motor driving circuit configured to drive the motor, a signal transmission circuit configured to output a signal input to the circuit board to the outside of the circuit board, and a connector to which an end of a wiring is connected are mounted on the circuit board.

In the robot of the present invention, the joint part includes a circuit board to which the motor and the position detection mechanism are electrically connected, and a signal transmission circuit configured to output a signal input to the circuit board to the outside of the circuit board and a connector are mounted on the circuit board. Therefore, in the present invention, when the robot includes a plurality of joint parts, one end of the wiring disposed between joint parts is connected to the connector of the circuit board of one joint part and the other end of the wiring is connected to the connector of the circuit board of the other joint part, and thus signal communication between joint parts is possible. Therefore, in the present invention, one end of the wiring disposed between joint parts is connected to the connector of the circuit board of one joint part and the other end of the wiring is connected to the connector of the circuit board of the other joint part, and thus drawing of the wiring between joint parts can be completed. In addition, when drawing of the wiring between joint parts is sequentially performed in this manner, drawing of the wiring of the robot can be completed. As a result, in the present invention, even if the robot includes a plurality of joint parts, drawing of the wiring can be simplified. In addition, in the present invention, since drawing of the wiring can be simplified, assembling of the robot becomes easier.

In addition, in the present invention, the joint part includes a motor, a reduction gear connected to the motor, an output-side member fixed to an output shaft of the reduction gear, a position detection mechanism configured to detect a rotational position of the motor, a circuit board to which the motor and the position detection mechanism are electrically connected, and a case in which the motor, the reduction gear, the position detection mechanism, and the circuit board are housed, and the motor and the reduction gear are fixed to the case. In addition, a motor driving circuit configured to drive the motor, a signal transmission circuit configured to output a signal input to the circuit board to the outside of the circuit board, and a connector to which an end of a wiring is connected are mounted on the circuit board. Therefore, in the present invention, the joint parts can be functionally integrated as a joint module. Thus, in the present invention, it is possible to easily change the number of joint parts of the robot.

In the present invention, for example, the motor is a hollow motor having a hollow rotation shaft, and the reduction gear is a hollow reduction gear which has a hollow input shaft connected to the rotation shaft and is disposed coaxially with the motor. In addition, in the present invention, for example, the joint part includes a cylindrical tubular member inserted into an inner circumferential side of the rotation shaft and the input shaft, a through-hole that communicates with an inner circumferential side of the tubular member is formed at the output-side member, and an opening that opens in a direction orthogonal to an axial direction of the output shaft is formed in the case. In this case, for example, two connectors are mounted on the circuit board, a wiring connected to one connector is drawn through the inner circumferential side of the tubular member and then is drawn out from the through-hole, and a wiring connected to the other connector is drawn out from the opening.

In the present invention, preferably, the output-side member includes a flange part that is formed in an annular shape and disposed outside the case. In such a configuration, it is possible to increase the fixing strength between the member fixed to the output-side member and the output-side member.

In the present invention, for example, the robot includes a first joint part, a second joint part, a third joint part, a fourth joint part, a fifth joint part, and a sixth joint part as the joint parts, a first arm and a second arm as the arms, and a support member fixed to the flange part of the first joint part, wherein at least two connectors including a first connector and a second connector are mounted as the connector on at least the circuit board of the second joint part, the circuit board of the third joint part, the circuit board of the fourth joint part, and the circuit board of the fifth joint part, wherein the first joint part and the second joint part are connected so that an axial direction of the output shaft of the first joint part and an axial direction of the output shaft of the second joint part are perpendicular to each other, and the case of the first joint part is fixed to the flange part of the second joint part, wherein the second joint part and the first arm are connected so that an axial direction of the output shaft of the second joint part and a longitudinal direction of the first arm are perpendicular to each other, and a base end of the first arm is fixed to the case of the second joint part, wherein the first arm and the third joint part are connected so that the longitudinal direction of the first arm and an axial direction of the output shaft of the third joint part are perpendicular to each other, and a tip of the first arm is fixed to the case of the third joint part, wherein the third joint part and the fourth joint part are connected so that the axial direction of the output shaft of the third joint part and an axial direction of the output shaft of the fourth joint part are perpendicular to each other, and the case of the fourth joint part is fixed to the flange part of the third joint part, wherein the fourth joint part and the second arm are connected so that the axial direction of the output shaft of the fourth joint part coincides with a longitudinal direction of the second arm, and a base end of the second arm is fixed to the flange part of the fourth joint part, wherein the second arm and the fifth joint part are connected so that the longitudinal direction of the second arm and an axial direction of the output shaft of the fifth joint part are perpendicular to each other, and a tip of the second arm is fixed to the case of the fifth joint part, wherein the fifth joint part and the sixth joint part are connected so that the axial direction of the output shaft of the fifth joint part and an axial direction of the output shaft of the sixth joint part are perpendicular to each other, and the case of the sixth joint part is fixed to the flange part of the fifth joint part, wherein one end of the wiring drawn out from the case of the sixth joint part is connected to the connector of the sixth joint part and the other end thereof is connected to the first connector of the fifth joint part, wherein one end of the wiring drawn out from the case of the fifth joint part is connected to the second connector of the fifth joint part, and the other end thereof is connected to the first connector of the fourth joint part, wherein one end of the wiring drawn out from the case of the fourth joint part is connected to the second connector of the fourth joint part and the other end thereof is connected to the first connector of the third joint part, wherein one end of the wiring drawn out from the case of the third joint part is connected to the second connector of the third joint part and the other end thereof is connected to the first connector of the second joint part, and wherein one end of the wiring drawn out from the case of the second joint part is connected to the second connector of the second joint part and the other end thereof is connected to the connector of the first joint part.

Advantageous Effects of Invention

As described above, in the present invention, even if the robot includes a plurality of joint parts, drawing of the wiring can be simplified.

DESCRIPTION OF EMBODIMENTS

Embodiments of the present invention will be described below with reference to the drawings.

Schematic Configuration of Industrial Robot

Figure 1:
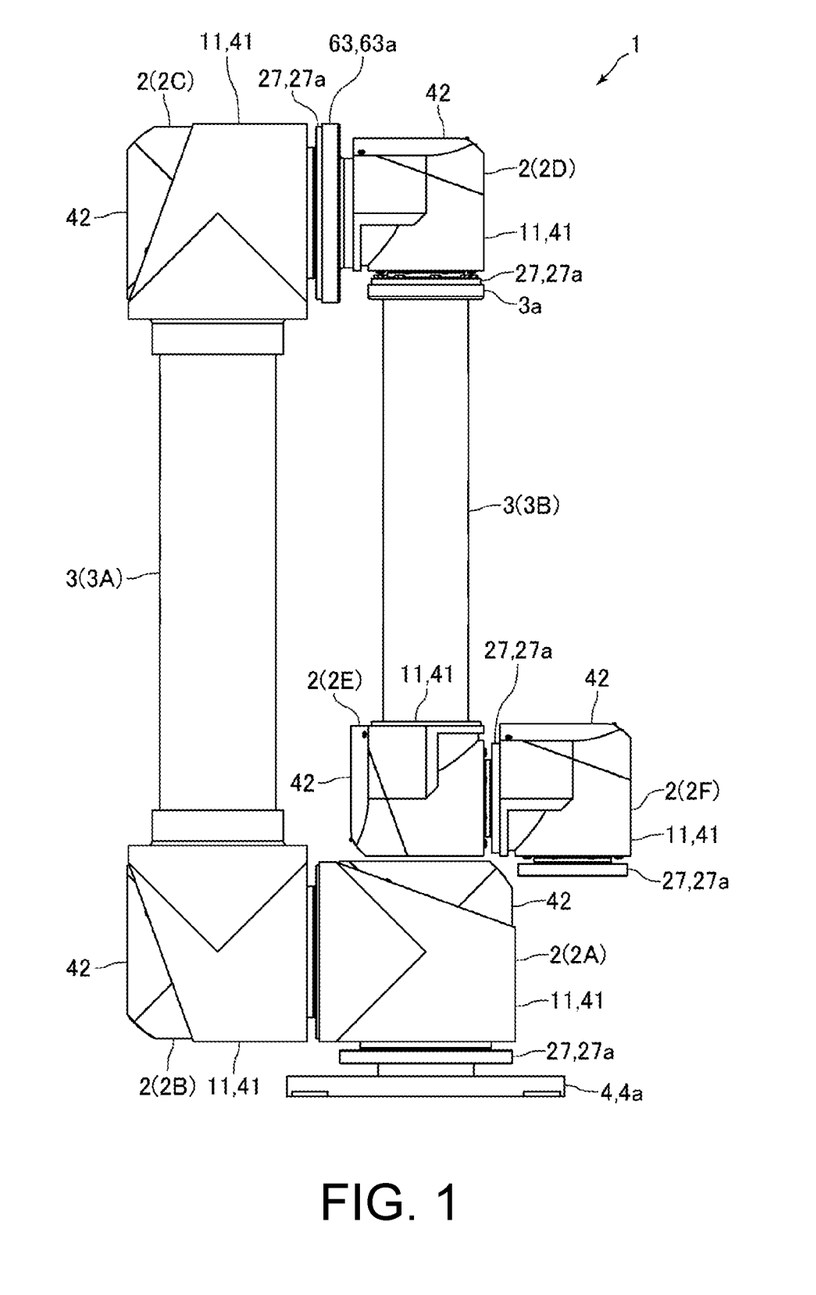
FIG. 1 is a front view of an industrial robot according to an embodiment of the present invention.
Figure 2A:
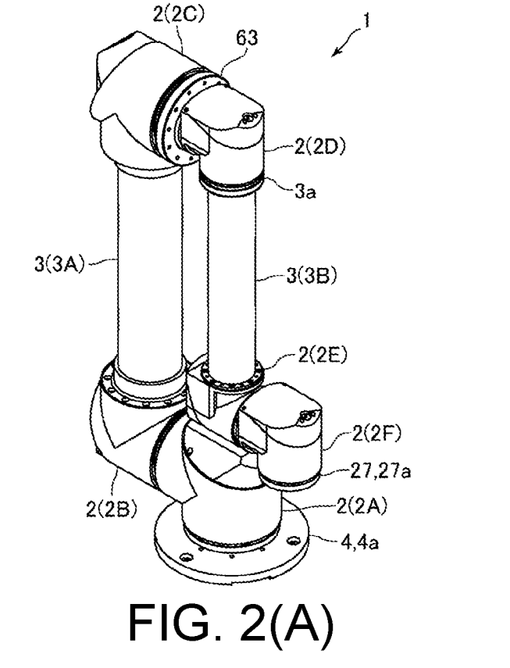
FIG. 2(A) is a perspective view of the industrial robot shown in FIG. 1.
Figure 2B:
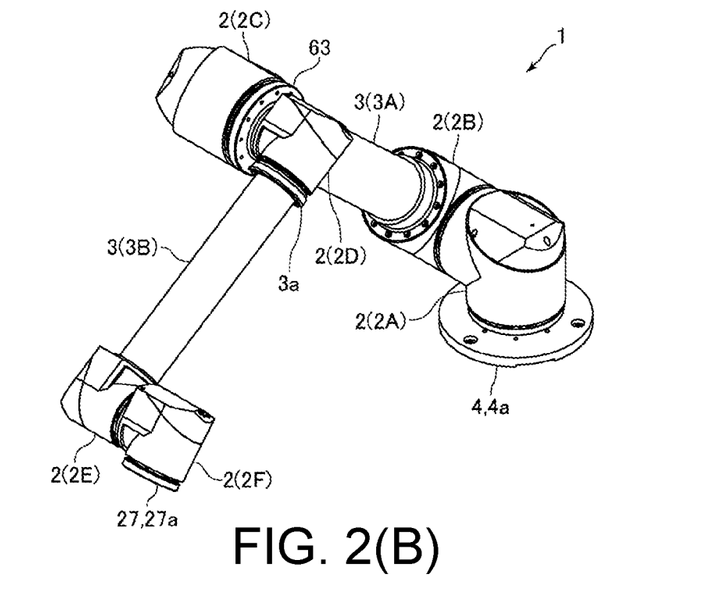
FIG. 2(B) is a perspective view showing a state in which the industrial robot shown in FIG. 2(A) is operating.

FIG. 1 is a front view of an industrial robot 1 according to an embodiment of the present invention. FIG. 2(A) is a perspective view of the industrial robot 1 shown in FIG. 1, and FIG. 2(B) is a perspective view showing a state in which the industrial robot 1 shown in FIG. 2(A) is operating.

The industrial robot 1 (hereinafter referred to as a "robot 1") of the present embodiment is an articulated robot used for assembling or producing a predetermined product and is used by being installed in an assembly line or a production line. The robot 1 includes a plurality of joint parts 2 and a plurality of arms 3. In the present embodiment, the robot 1 includes six joint parts 2 and two arms 3. Hereinafter, when the six joint parts 2 are distinguishably referred to, the six joint parts 2 are referred to as a "first joint part 2A," a "second joint part 2B," a "third joint part 2C," a "fourth joint part 2D," a "fifth joint part 2E," and a "sixth joint part 2F." In addition, hereinafter, when two arms 3 are distinguishably referred to, the two arms 3 are referred to as a "first arm 3A" and a "second arm 3B."

In addition, the robot 1 includes a support member 4 that is connected to the first joint part 2A in a relatively rotatable manner. The support member 4 is formed in a cylindrical shape with a rim having a flange part 4a, and a through-hole (not shown) that penetrates the support member 4 in an axial direction is formed on the inner circumferential side of the support member 4. The flange part 4a is formed in an annular shape and constitutes a bottom part of the robot 1. The arm 3 is formed in an elongated cylindrical shape.

In the robot 1, the first joint part 2A and the second joint part 2B are connected in a relatively rotatable manner, and the second joint part 2B and a base end of the first arm 3A are fixed. In addition, a tip of the first arm 3A and the third joint part 2C are fixed, the third joint part 2C and the fourth joint part 2D are connected in a relatively rotatable manner, the fourth joint part 2D and a base end of the second arm 3B are connected in a relatively rotatable manner, a tip of the second arm 3B and the fifth joint part 2E are fixed, and the fifth joint part 2E and the sixth joint part 2F are connected in a relatively rotatable manner. In addition, a hand, a tool, and the like can be attached to the sixth joint part 2F in a relatively rotatable manner.

A specific configuration of the joint part 2 will be described below. Here, as shown in FIG. 1, in the present embodiment, the first joint part 2A, the second joint part 2B, and the third joint part 2C are formed to have the same size, and the fourth joint part 2D, the fifth joint part 2E, and the sixth joint part 2F are formed to have the same size. In addition, the sizes of the first joint part 2A, the second joint part 2B, and the third joint part 2C are larger than the sizes of the fourth joint part 2D, the fifth joint part 2E and the sixth joint part 2F. However, the first joint part 2A, the second joint part 2B, and the third joint part 2C, the fourth joint part 2D, the fifth joint part 2E and the sixth joint part 2F have the same configuration except for different sizes.

Configuration of Joint Part

Figure 3:
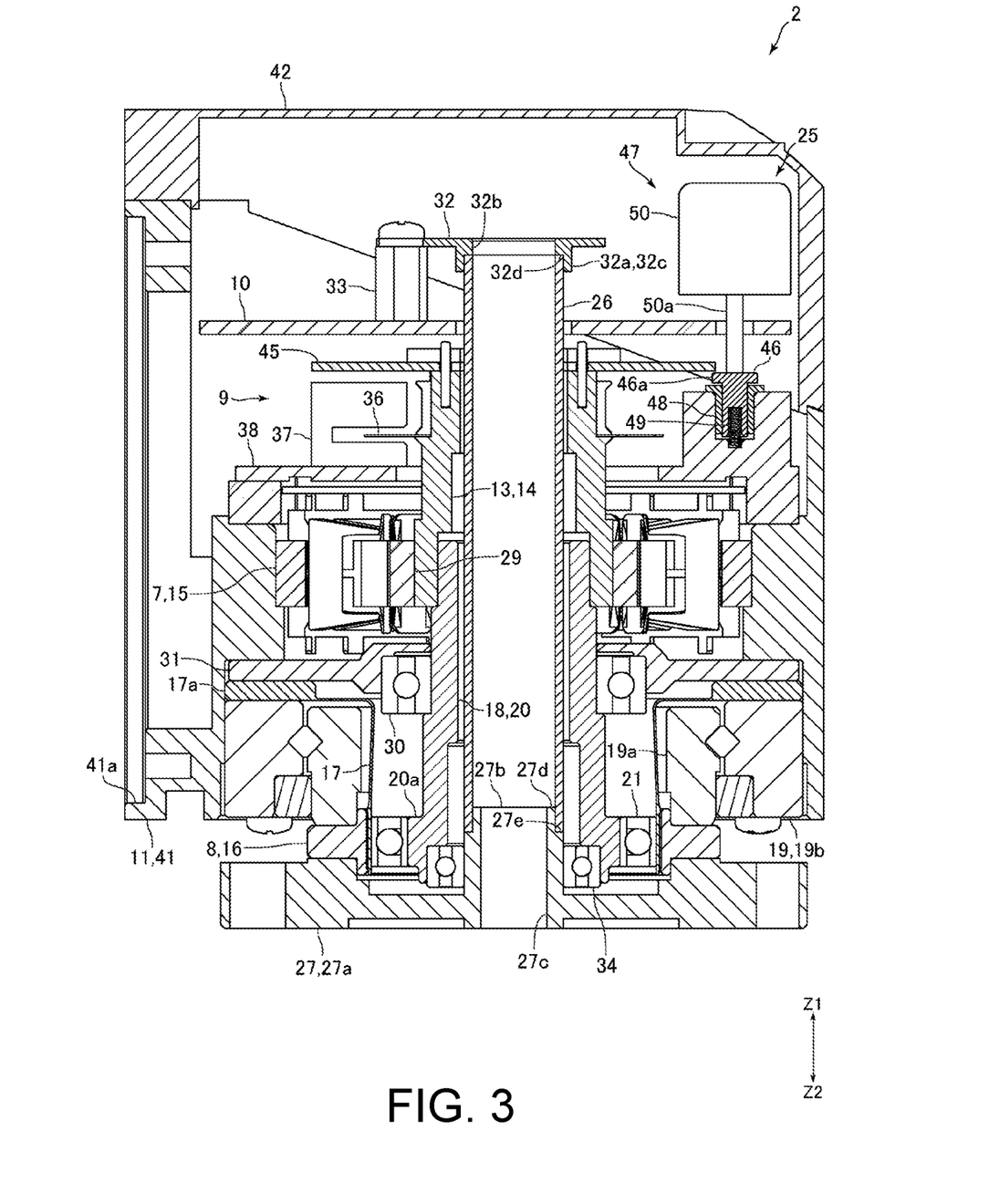
FIG. 3 is a longitudinal cross-sectional view of a joint part shown in FIG. 1.
Figure 4:
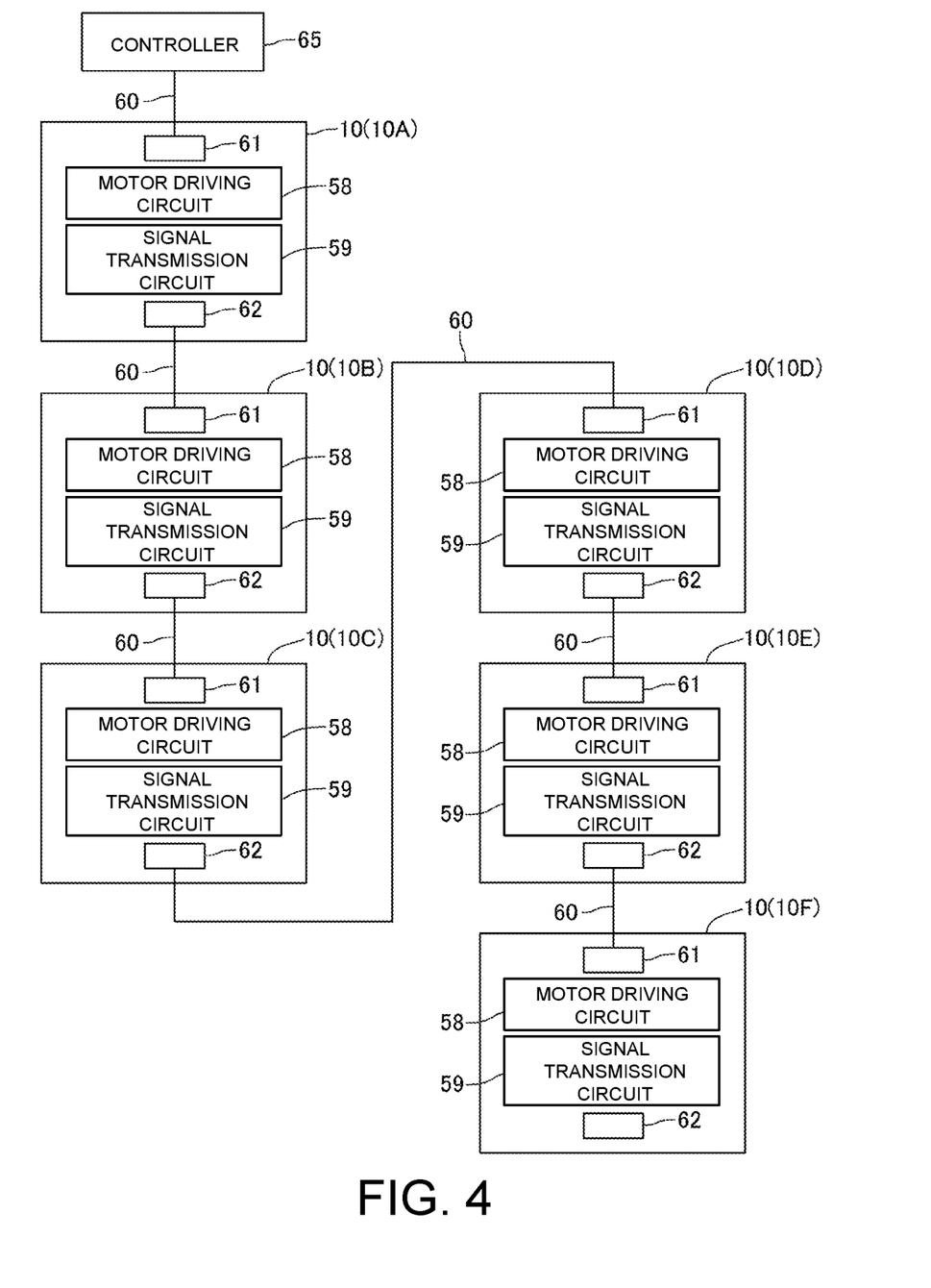
FIG. 4 is a block diagram for explaining an electrical connection relationship between a first joint part, a second joint part, a third joint part, a fourth joint part, a fifth joint part, and a sixth joint part shown in FIG. 1.

FIG. 3 is a longitudinal cross-sectional view of the joint part 2 shown in FIG. 1. FIG. 4 is a block diagram for explaining an electrical connection relationship between the first joint part 2A, the second joint part 2B, the third joint part 2C, the fourth joint part 2D, the fifth joint part 2E, and the sixth joint part 2F shown in FIG. 1. Hereinafter, for convenience of description, the side in a Z1 direction in FIG. 3 will be defined as the "upper" side and the side in a Z2 direction which is the side opposite thereto will be defined as the "lower" side.

The joint part 2 includes a motor 7, a reduction gear 8 connected to the motor 7, a position detection mechanism 9 configured to detect a rotational position of the motor 7, a circuit board 10 to which the motor 7 and the position detection mechanism 9 are electrically connected, and a case 11 in which the motor 7, the reduction gear 8, the position detection mechanism 9, and the circuit board 10 are housed. The motor 7 is a hollow motor in which a through-hole is formed at the center in a radial direction and has a hollow rotation shaft 13. In addition, the motor 7 includes a rotor 14 and a stator 15. The reduction gear 8 is a hollow reduction gear in which a through-hole is formed at the center in the radial direction. The motor 7 and the reduction gear 8 are disposed in an overlapping manner in the up-down direction. Specifically, the motor 7 is disposed on the upper side and the reduction gear 8 is disposed on the lower side. In addition, the motor 7 and the reduction gear 8 are disposed on the same axis.

The reduction gear 8 of the present embodiment is a hollow wave gear device, and includes a rigid internal gear 16, a flexible external gear 17, a wave generation unit 18, and a cross roller bearing 19. The wave generation unit 18 includes a hollow input shaft 20 connected to the rotation shaft 13 and a wave bearing 21 attached to the outer circumferential side of the input shaft 20. In the present embodiment, the rigid internal gear 16 serves as an output shaft of the reduction gear 8. In addition, the joint part 2 includes a rotation restriction mechanism 25 that restricts rotation of the rotor 14 that is stopped, a cylindrical tubular member 26 inserted into the inner circumferential side of the rotation shaft 13 and the input shaft 20, and an output-side member 27 fixed to the rigid internal gear 16.

As described above, the motor 7 includes the rotor 14 and the stator 15. The rotor 14 includes the rotation shaft 13 and a driving magnet 29 fixed to the rotation shaft 13. The rotation shaft 13 is formed in a substantially cylindrical shape elongated in the up-down direction and is disposed so that the axial direction of the rotation shaft 13 coincides with the up-down direction. That is, the up-down direction is the axial direction of the rotation shaft 13 and the axial direction of the rotor 14. The driving magnet 29 is formed in a cylindrical shape. The length (length in the up-down direction) of the driving magnet 29 is shorter than the rotation shaft 13, and the driving magnet 29 is fixed to the outer circumferential surface of the lower end side part of the rotation shaft 13. In the present embodiment, the driving magnet 29 is fixed to the outer circumferential surface of the rotation shaft 13 so that the lower end surface of the rotation shaft 13 and the lower end surface of the driving magnet 29 are aligned.

The stator 15 is formed in a substantially cylindrical shape as a whole, and is disposed on the outer circumferential side of the driving magnet 29 to cover the outer circumferential surface of the driving magnet 29. The upper end side part of the rotation shaft 13 protrudes upward from the upper end surface of the stator 15. The stator 15 includes a driving coil and a stator core having a plurality of salient poles around which a driving coil is wound via an insulator. The salient poles of the stator core are formed to protrude toward the inner circumferential side and a tip surface of the salient poles faces the outer circumferential surface of the driving magnet 29. The motor 7 is fixed to the case 11. Specifically, the outer circumferential surface of the stator 15 is fixed to the case 11.

As described above, the reduction gear 8 includes the rigid internal gear 16, the flexible external gear 17, the wave generation unit 18, and the cross roller bearing 19. The rigid internal gear 16 is formed in a flat and substantially cylindrical shape, and is disposed so that the axial direction of the rigid internal gear 16 and the up-down direction are aligned. That is, the up-down direction is the axial direction of the rigid internal gear 16 which is an output shaft of the reduction gear 8. The rigid internal gear 16 is fixed to an inner ring 19a of the cross roller bearing 19. An outer ring 19b of the cross roller bearing 19 is fixed to the lower end side part of the case 11, and the rigid internal gear 16 is rotatably held by the lower end side part of the case 11 via the cross roller bearing 19.

The flexible external gear 17 is formed in a substantially tubular shape with a rim having a flange part 17a at its upper end. The flange part 17a is formed in a substantially annular shape and an outer circumferential side part of the flange part 17a is fixed to the case 11. That is, the reduction gear 8 is fixed to the case 11. The rigid internal gear 16 constitutes a lower end side part of the reduction gear 8. The flange part 17a constitutes an upper end side part of the reduction gear 8. Internal teeth are formed on the inner circumferential surface of the rigid internal gear 16. On the outer circumferential surface on the lower end side of the flexible external gear 17, external teeth meshed with the internal teeth of the rigid internal gear 16 are formed.

As described above, the wave generation unit 18 includes the input shaft 20 and the wave bearing 21. The input shaft 20 is formed in a tubular shape elongated in the up-down direction as a whole and is disposed so that the axial direction of the input shaft 20 coincides with the up-down direction. A part other than the lower end side part of the input shaft 20 is formed in an elongated and substantially cylindrical shape. The lower end side part of the input shaft 20 becomes an elliptical part 20a in which the shape of the inner circumferential surface when viewed in the axial direction of the input shaft 20 is a circular shape and the shape of the outer circumferential surface when viewed in the axial direction of the input shaft 20 is an elliptical shape.

The upper end side part of the input shaft 20 is inserted into and fixed to the inner circumferential side of the lower end side part of the rotation shaft 13. Specifically, the upper end side part of the input shaft 20 is inserted and fixed to the inner circumferential side of a part of the rotation shaft 13 to which the driving magnet 29 is fixed. The rotation shaft 13 and the input shaft 20 are disposed on the same axis. In addition, the upper end side part of the input shaft 20 is fixed to the rotation shaft 13 by bonding.

The central part of the input shaft 20 in the up-down direction is rotatably supported by a bearing 30. The bearing 30 is a ball bearing. The bearing 30 is attached to a bearing holding member 31, and the bearing holding member 31 is fixed to the case 11. That is, the input shaft 20 is rotatably supported by the bearing 30 attached to the case 11 via the bearing holding member 31. The bearing holding member 31 is formed in an annular and flat plate shape, and is fixed to the case 11 so that it overlaps the flange part 17a of the flexible external gear 17 in the up-down direction.

The wave bearing 21 is a ball bearing including a flexible inner ring and outer ring. The wave bearing 21 is disposed along the outer circumferential surface of the elliptical part 20a and is bent elliptically. A lower end side part of the flexible external gear 17 in which external teeth are formed is disposed on the outer circumferential side of the wave bearing 21 to surround the wave bearing 21, and this part is bent elliptically. The external teeth of the flexible external gear 17 are meshed with the internal teeth of the rigid internal gear 16 at two parts of the lower end side part of the flexible external gear 17 bent elliptically in the long axis direction.

The output-side member 27 is formed in a substantially cylindrical shape with a rim including a flange part 27a and a cylindrical part 27b. The output-side member 27 is disposed so that the axial direction of the output-side member 27 coincides with the up-down direction, and a through-hole 27c that penetrates in the up-down direction is formed on the inner circumferential side of the output-side member 27. The flange part 27a is formed in a flat plate and annular shape and is connected to the lower end of the cylindrical part 27b. The flange part 27a is fixed to the rigid internal gear 16 so that the upper surface of the flange part 27a comes in contact with the lower surface of the rigid internal gear 16. In addition, the flange part 27a is disposed below the lower end of the case 11 and is disposed outside the case 11.

On the upper end side of the cylindrical part 27b, a small-diameter part 27d having a smaller outer diameter than the lower end side part of the cylindrical part 27b is formed. On the outer circumferential side of the upper end side part of the cylindrical part 27b, an annular stepped surface 27e that is orthogonal to the up-down direction is formed. The small-diameter part 27d is inserted into the inner circumferential side of the lower end side part of the tubular member 26 and the lower end surface of the tubular member 26 faces the stepped surface 27e. In addition, the through-hole 27c communicates with the inner circumferential side of the tubular member 26. The upper end side part of the cylindrical part 27b is disposed on the inner circumferential side of the lower end side part of the input shaft 20. A bearing 34 is disposed between the outer circumferential surface of the cylindrical part 27b and the inner circumferential surface of the lower end side part of the input shaft 20. The bearing 34 is a ball bearing.

The tubular member 26 is formed in a cylindrical shape elongated in the up-down direction and is disposed so that the axial direction of the tubular member 26 coincides with the up-down direction. As described above, the tubular member 26 is inserted into the inner circumferential side of the rotation shaft 13 and the input shaft 20. The upper end surface of the tubular member 26 is disposed above the upper end surface of the rotation shaft 13, and the lower end surface of the tubular member 26 is disposed above the lower end surface of the input shaft 20. In addition, as described above, the small-diameter part 27d of the output-side member 27 is inserted into the inner circumferential side of the lower end side part of the tubular member 26, the lower end surface of the tubular member 26 faces the stepped surface 27e, and the lower end side of the tubular member 26 is held by the output-side member 27.

The upper end side of the tubular member 26 is held by a holding member 32. The holding member 32 is fixed to a support 33, and the support 33 is fixed to the case 11. That is, the holding member 32 is fixed to the case 11 via the support 33. The holding member 32 includes a cylindrical holding part 32a for holding the upper end side of the tubular member 26. The holding part 32a is disposed so that the axial direction of the holding part 32a coincides with the up-down direction. On the inner circumferential side of the holding part 32a, a through-hole 32b that penetrates in the up-down direction is formed.

On the lower end side of the holding part 32a, a large-diameter part 32c having a larger inner diameter than the upper end side of the holding part 32a is formed. On the inner circumferential side of the lower end side part of the holding part 32a, an annular stepped surface 32d orthogonal to the up-down direction is formed. The upper end side of the tubular member 26 is inserted into the inner circumferential side of the large-diameter part 32c, and the upper end surface of the tubular member 26 faces the stepped surface 32d. In addition, the through-hole 32b communicates with the inner circumferential side of the tubular member 26.

The position detection mechanism 9 is disposed above the stator 15. The position detection mechanism 9 includes a slit plate 36 fixed to the upper end side of the rotation shaft 13 and a sensor 37. The sensor 37 is a transmission type optical sensor including a light emitting element and a light receiving element which are disposed to face each other. The sensor 37 is fixed to a support member 38. The support member 38 is fixed to the case 11. That is, the sensor 37 is fixed to the case 11 via the support member 38. The slit plate 36 is formed into a thin flat plate shape and formed in an annular shape. In the slit plate 36, a plurality of slit holes are formed at certain intervals in the circumferential direction of the slit plate 36. The slit plate 36 is fixed to the rotation shaft 13 so that a part of the slit plate 36 in the circumferential direction is disposed between the light emitting element and the light receiving element of the sensor 37.

The case 11 includes a case main body 41 of which both upper and lower ends are open and a cover 42 that blocks an opening on the upper end side of the case main body 41. An opening on the lower end side of the case main body 41 is blocked by the reduction gear 8. On a side surface of the case main body 41, an opening 41a that opens in a direction orthogonal to the up-down direction is formed. That is, in the case 11, the opening 41a that opens in a direction orthogonal to the up-down direction is formed. The opening 41a is formed to penetrate through a side part of the case main body 41.

The rotation restriction mechanism 25 is housed in the case 11. The rotation restriction mechanism 25 includes a flat plate-like and substantially annular rotation-side restricting member 45 fixed to the rotor 14, a fixing-side restricting member 46 which is engaged with the rotation-side restricting member 45 and restricts movement of the rotation-side restricting member 45 in the circumferential direction of the rotor 14, a drive mechanism 47 that moves the fixing-side restricting member 46 in the up-down direction, and a linear bushing 48 that guides the fixing-side restricting member 46 in the up-down direction. The drive mechanism 47 includes a compression coil spring 49 that biases the fixing-side restricting member 46 upward and a solenoid 50 that moves the fixing-side restricting member 46 downward.

The fixing-side restricting member 46 is formed in a columnar shape with a rim having a flange part 46a at its upper end, and is disposed so that the axial direction of the fixing-side restricting member 46 coincides with the up-down direction. The fixing-side restricting member 46 is fixed to a plunger 50a of the solenoid 50 disposed on the upper side of the fixing-side restricting member 46. On the lower end surface of the fixing-side restricting member 46, a concave part that is recessed toward the upper side is formed. An upper end side part of the compression coil spring 49 is disposed in the concave part.

The linear bushing 48 is formed in a cylindrical shape with a rim having a flange part at its upper end and is disposed so that the axial direction of the linear bushing 48 coincides with the up-down direction. A part of the linear bushing 48 below the flange part is disposed in the concave part formed on the upper surface of the support member 38. On a bottom of the concave part, a recess in which the lower end side part of the compression coil spring 49 is disposed is formed to be recessed downward. On the inner circumferential side of the linear bushing 48, a part of the fixing-side restricting member 46 below the flange part 46a is disposed.

The rotation-side restricting member 45 is fixed to the upper end surface of the rotation shaft 13 so that the thickness direction of the rotation-side restricting member 45 coincides with the up-down direction, and is disposed above the position detection mechanism 9. On the rotation-side restricting member 45, a plurality of protrusions that protrude radially outward from the rotor 14 are formed at certain intervals in the circumferential direction of the rotor 14.

When the solenoid 50 is not energized, the fixing-side restricting member 46 is raised by a biasing force of the compression coil spring 49 so that the flange part 46a of the fixing-side restricting member 46 is disposed between protrusions of the rotation-side restricting member 45 in the circumferential direction of the rotor 14. Therefore, rotation of the rotor 14 that is stopped is restricted according to the protrusion of the rotation-side restricting member 45 and the flange part 46a. On the other hand, when the solenoid 50 is energized, as shown in FIG. 3, the fixing-side restricting member 46 descends until the plunger 50a protrudes downward and the flange part 46a is disengaged from between protrusions of the rotation-side restricting member 45 in the circumferential direction of the rotor 14. Therefore, the rotor 14 is rotatable.

The circuit board 10 is a rigid board such as a glass epoxy board and is formed in a flat plate shape. The circuit board 10 is fixed to the case 11 so that the thickness direction of the circuit board 10 coincides with the up-down direction. In addition, the circuit board 10 is fixed to the upper end side of the case 11 and is disposed above the rotation-side restricting member 45. The upper end of the tubular member 26 is disposed above the upper surface of the circuit board 10.

As shown in FIG. 4, on the circuit board 10, a motor driving circuit 58 configured to drive the motor 7 and a signal transmission circuit 59 configured to output a signal input to the circuit board 10 to the outside of the circuit board 10 are mounted. In addition, on the circuit board 10, connectors 61 and 62 to which an end of a wiring 60 is connected is mounted. Specifically, at least two connectors 61 and 62 are mounted on the circuit board 10. The connectors 61 and 62 are mounted on the upper surface of the circuit board 10. Here, the connectors 61 and 62 are a male type or female type connector, and when male type or female type connectors fixed to an end of the wiring 60 are engaged with the connectors 61 and 62, an end of the wiring 60 is connected to the connectors 61 and 62.

For example, the signal transmission circuit 59 is provided to output an output signal (specifically, an output signal from the sensor 37) from the position detection mechanism 9 or a signal obtained by processing the output signal on the circuit board 10 from the connector 61 or the connector 62 to the outside of the circuit board 10. In addition, the signal transmission circuit 59 is provided to output a signal input from the connector 61 to the connector 62 and output a signal input from the connector 62 from the connector 61.

Structure of Connecting Joint Parts and Arms

As described above, the support member 4 and the first joint part 2A are connected in a relatively rotatable manner, the first joint part 2A and the second joint part 2B are connected in a relatively rotatable manner, the second joint part 2B and a base end of the first arm 3A are fixed, a tip of the first arm 3A and the third joint part 2C are fixed, the third joint part 2C and the fourth joint part 2D are connected in a relatively rotatable manner, the fourth joint part 2D and a base end of the second arm 3B are connected in a relatively rotatable manner, a tip of the second arm 3B and the fifth joint part 2E are fixed, and the fifth joint part 2E and the sixth joint part 2F are connected in a relatively rotatable manner. Specifically, for example, the joint parts 2 and the arms 3 are connected as described above so that the robot 1 can perform the operation shown in FIG. 2(B).

Here, in the following description, the axial direction of the rigid internal gear 16 of the first joint part 2A will be defined as "the axial direction of the first joint part 2A," the axial direction of the rigid internal gear 16 of the second joint part 2B will be defined as "the axial direction of the second joint part 2B," the axial direction of the rigid internal gear 16 of the third joint part 2C will be defined as "the axial direction of the third joint part 2C," the axial direction of the rigid internal gear 16 of the fourth joint part 2D will be defined as "the axial direction of the fourth joint part 2D," the axial direction of the rigid internal gear 16 of the fifth joint part 2E will be defined as "the axial direction of the fifth joint part 2E," and the axial direction of the rigid internal gear 16 of the sixth joint part 2F will be defined as "the axial direction of the sixth joint part 2F."

First, the support member 4 and the first joint part 2A are connected by fixing the support member 4 to the flange part 27a of the first joint part 2A. Specifically, the support member 4 and the first joint part 2A are connected when an end surface of the support member 4 on the side on which the flange part 4a is not formed is fixed to the flange part 27a of the first joint part 2A. That is, the support member 4 and the first joint part 2A are connected to each other so that the axial direction of the first joint part 2A coincides with the axial direction of the support member 4. The through-hole 27c of the output-side member 27 of the first joint pad 2A communicates with a through-hole of the support member 4.

The first joint part 2A and the second joint part 2B are connected so that the axial direction of the first joint part 2A and the axial direction of the second joint part 2B are perpendicular to each other. In addition, the case 11 of the first joint part 2A is fixed to the flange part 27a of the second joint part 2B. Specifically, a side surface on which the opening 41a of the case main body 41 of the first joint part 2A is formed is fixed to the flange part 27a of the second joint part 2B. The flange part 27a of the second joint part 2B blocks the opening 41a of the case main body 41 of the first joint part 2A, and the through-hole 27c of the output-side member 27 of the second joint part 2B communicates with the inside of the case 11 of the first joint part 2A.

The second joint part 2B and the first arm 3A are connected so that the axial direction of the second joint part 2B and the longitudinal direction (axial direction) of the first arm 3A are perpendicular to each other. In addition, a base end of the first arm 3A is fixed to the case 11 of the second joint part 2B. Specifically, a base end of the first arm 3A is fixed to a side surface on which the opening 41a of the case main body 41 of the second joint part 2B is formed. A base end of the first arm 3A blocks the opening 41a of the case main body 41 of the second joint part 2B, and the inner circumferential side of the first arm 3A communicates with the inside of the case 11 of the second joint part 2B.

The first arm 3A and the third joint part 2C are connected so that the longitudinal direction of the first arm 3A and the axial direction of the third joint part 2C are perpendicular to each other. In addition, a tip of the first arm 3A is fixed to the case 11 of the third joint part 2C. Specifically, a tip of the first arm 3A is fixed to a side surface on which the opening 41a of the case main body 41 of the third joint part 2C is formed. A tip of the first arm 3A blocks the opening 41a of the case main body 41 of the third joint part 2C, and the inner circumferential side of the first arm 3A communicates with the inside of the case 11 of the third joint part 2C.

The third joint part 2C and the fourth joint part 2D are connected so that the axial direction of the third joint part 2C and the axial direction of the fourth joint part 2D are perpendicular to each other. In addition, the case 11 of the fourth joint part 2D is fixed to the flange part 27a of the third joint part 2C. Specifically, a side surface on which the opening 41a of the case main body 41 of the fourth joint part 2D is formed is fixed to the flange part 27a of the third joint part 2C. More specifically, via a connecting member 63 fixed to a side surface on which the opening 41a of the case main body 41 of the fourth joint part 2D is formed, a side surface on which the opening 41a of the case main body 41 of the fourth joint part 2D is formed is fixed to the flange part 27a of the third joint part 2C. The connecting member 63 is formed in a cylindrical shape with a rim having a flange part 63a fixed to the flange part 27a of the third joint part 2C. The connecting member 63 blocks the opening 41a of the case main body 41 of the fourth joint part 2D, and a through-hole that penetrates in the axial direction of the connecting member 63 and the through-hole 27c of the output-side member 27 of the third joint part 2C communicate with the inside of the case 11 of the fourth joint part 2D.

The fourth joint part 2D and the second arm 3B are connected so that the axial direction of the fourth joint part 2D and the longitudinal direction of the second arm 3B coincide. In addition, a base end of the second arm 3B is fixed to the flange part 27a of the fourth joint part 2D. The inner circumferential side of the second arm 3B communicates with the through-hole 27c of the output-side member 27 of the fourth joint part 2D. Here, at a base end of the second arm 3B, a flange part 3a for fixing a base end of the second arm 3B to the flange part 27a of the fourth joint part 2D is formed, and the flange part 27a of the fourth joint part 2D and the flange part 3a are fixed to each other.

The second arm 3B and the fifth joint part 2E are connected so that the longitudinal direction of the second arm 3B and the axial direction of the fifth joint part 2E are perpendicular to each other. In addition, a tip of the second arm 3B is fixed to the case 11 of the fifth joint part 2E. Specifically, a tip of the second arm 3B is fixed to a side surface on which the opening 41a of the case main body 41 of the fifth joint part 2E is formed. A tip of the second arm 3B blocks the opening 41a of the case main body 41 of the fifth joint part 2E, and the inner circumferential side of the second arm 3B communicates with the inside of the case 11 of the fifth joint part 2E.

The fifth joint part 2E and the sixth joint part 2F are connected so that the axial direction of the fifth joint part 2E and the axial direction of the sixth joint part 2F are perpendicular to each other. In addition, the case 11 of the sixth joint part 2F is fixed to the flange part 27a of the fifth joint part 2E. Specifically, a side surface on which the opening 41a of the case main body 41 of the sixth joint part 2F is formed is fixed to the flange part 27a of the fifth joint part 2E. The flange part 27a of the fifth joint part 2E blocks the opening 41a of the case main body 41 of the sixth joint part 2F, and the through-hole 27c of the output-side member 27 of the fifth joint part 2E communicates with the inside of the case 11 of the sixth joint part 2F.

Wiring Drawing Structure

A drawing structure of the wiring 60 inside the robot 1 will be described below. In the following description, the circuit board 10 of the first joint part 2A is referred to as a "circuit board 10A," the circuit board 10 of the second joint part 2B is referred to as a "circuit board 10B," the circuit board 10 of the third joint part 2C is referred to as a "circuit board 10C," the circuit board 10 of the fourth joint part 2D is referred to as a "circuit board 10D," the circuit board 10 of the fifth joint part 2E is referred to as a "circuit board 10E," and the circuit board 10 of the sixth joint part 2F is referred to as a "circuit board 10F."

As shown in FIG. 4, between the sixth joint part 2F and the fifth joint part 2E, the connector 61 of the circuit board 10F of the sixth joint part 2F and the connector 62 of the circuit board 10E of the fifth joint part 2E are connected by the wiring 60. That is, one end of the wiring 60 drawn out from the case 11 of the sixth joint part 2F is connected to the connector 61 of the circuit board 10F and the other end thereof is connected to the connector 62 of the circuit board 10E. The wiring 60 is drawn out from the case 11 of the sixth joint part 2F through the opening 41a of the sixth joint part 2F, drawn through the through-hole 27c of the output-side member 27 of the fifth joint part 2E and the inner circumferential side of the tubular member 26 of the fifth joint part 2E, and connected to the connector 62 of the circuit board 10E.

Between the fifth joint part 2E and the fourth joint part 2D, the connector 61 of the circuit board 10E of the fifth joint part 2E and the connector 62 of the circuit board 10D of the fourth joint part 2D are connected by the wiring 60. That is, one end of the wiring 60 drawn out from the case 11 of the fifth joint part 2E is connected to the connector 61 of the circuit board 10E and the other end thereof is connected to the connector 62 of the circuit board 10D. The wiring 60 is drawn out from the case 11 of the fifth joint part 2E through the opening 41a of the fifth joint part 2E, and drawn through the inner circumferential side of the second arm 3B, the through-hole 27c of the output-side member 27 of the fourth joint part 2D and the inner circumferential side of the tubular member 26 of the fourth joint part 2D, and is connected to the connector 62 of the circuit board 10D.

Between the fourth joint part 2D and the third joint part 2C, the connector 61 of the circuit board 10D of the fourth joint part 2D and the connector 62 of the circuit board 10C of the third joint part 2C are connected by the wiring 60. That is, one end of the wiring 60 drawn out from the case 11 of the fourth joint part 2D is connected to the connector 61 of the circuit board 10D and the other end thereof is connected to the connector 62 of the circuit board 10C. The wiring 60 is drawn out from the case 11 of the fourth joint part 2D through the opening 41a of the fourth joint part 2D, drawn through the through-hole of the connecting member 63, the through-hole 27c of the output-side member 27 of the third joint part 2C, and the inner circumferential side of the tubular member 26 of the third joint part 2C, and connected to the connector 62 of the circuit board 10C.

Between the third joint part 2C and the second joint part 2B, the connector 61 of the circuit board 10C of the third joint part 2C and the connector 62 of the circuit board 10B of the second joint part 2B are connected by the wiring 60. That is, one end of the wiring 60 drawn out from the case 11 of the third joint part 2C is connected to the connector 61 of the circuit board 10C and the other end thereof is connected to the connector 62 of the circuit board 10B. The wiring 60 is drawn out from the case 11 of the third joint part 2C through the opening 41a of the third joint part 2C, drawn through the inner circumferential side of the first arm 3A and the opening 41a of the second joint part 2B, and connected to the connector 62 of the circuit board 10B.

Between the second joint part 2B and the first joint part 2A, the connector 61 of the circuit board 10B of the second joint part 2B and the connector 62 of the circuit board 10A of the first joint part 2A are connected by the wiring 60. That is, one end of the wiring 60 drawn out from the case 11 of the second joint part 2B is connected to the connector 61 of the circuit board 10B, and the other end thereof is connected to the connector 62 of the circuit board 10A. The wiring 60 is drawn out from the case 11 of the second joint part 2B through the inner circumferential side of the tubular member 26 of the second joint part 2B and the through-hole 27c of the output-side member 27 of the second joint part 2B, drawn through the opening 41a of the first joint part 2A, and connected to the connector 62 of the circuit board 10A.

Here, the connector 61 of the circuit board 10A is connected to a controller 65 of the robot 1 via the wiring 60. The wiring 60 is drawn out from the case 11 of the first joint part 2A through the inner circumferential side of the tubular member 26 of the first joint part 2A and the through-hole 27c of the output-side member 27 of the first joint part 2A, and is drawn through the through-hole of the support member 4. In addition, in the present embodiment, the connector 62 of the circuit boards 10B, 10C, 10D, and 10E is a first connector, and the connector 61 of the circuit boards 10B, 10C, 10D, and 10E is a second connector.

Main Effects of the Present Embodiment

As described above, in the present embodiment, the joint part 2 includes the circuit board 10 to which the motor 7 and the position detection mechanism 9 are electrically connected, and the signal transmission circuit 59 configured to output a signal input to the circuit board 10 to the outside of the circuit board 10 and the connectors 61 and 62 are mounted on the circuit board 10. Therefore, in the present embodiment, as described above, one end of the wiring 60 disposed between six joint parts 2 is connected to the connector 61 of the circuit board 10 of one joint part 2 and the other end of the wiring 60 is connected to the connector 62 of the circuit board 10 of the other joint part 2, and thus signal communication between the six joint parts 2 and signal communication between the six joint parts 2 and the controller 65 become possible. Therefore, in the present embodiment, one end of the wiring 60 disposed between the six joint parts 2 is connected to the connector 61 of the circuit board 10 of one joint part 2 and the other end of the wiring 60 is connected to the connector 62 of the circuit board 10 of the other joint part 2, and thus drawing of the wiring 60 between the six joint parts 2 can be completed. As a result, in the present embodiment, even if the robot 1 includes a plurality of joint parts 2, it is possible to simplify drawing of the wiring 60. In addition, in the present embodiment, since drawing of the wiring 60 can be simplified, assembling of the robot 1 becomes easier.

In the present embodiment, the joint part 2 includes the motor 7, the reduction gear 8, the position detection mechanism 9, the circuit board 10, the case 11, and the output-side member 27, and the motor 7 and the reduction gear 8 are fixed to the case 11. In addition, in the present embodiment, the motor driving circuit 58, the signal transmission circuit 59, and the connectors 61 and 62 are mounted on the circuit board 10. Therefore, in the present embodiment, the joint parts 2 can be functionally integrated as a joint module.

Thus, in the present embodiment, it is possible to easily change the number of joint parts 2 of the robot 1. That is, for example, when the case 11 of the sixth joint part 2F fixed to the flange part 27*a* of the fifth joint part 2E is removed and the wiring 60 connected to the connector 62 of the circuit board 10E is removed, the number of joint parts 2 of the robot 1 can be changed from 6 to 5, and thus it is possible to easily change the number of joint parts 2 of the robot 1.

In the present embodiment, the output-side member 27 is fixed to the rigid internal gear 16 serving as an output shaft of the reduction gear 8, and the flange part 27*a* disposed outside the case 11 is formed on the output-side member 27. Therefore, in the present embodiment, it is possible to increase the fixing strength between the joint parts 2 using the flange part 27*a*.

Other Embodiments

The above embodiment is only an example of preferable embodiments of the present invention, but the present invention is not limited thereto, and various modifications can be made without changing the spirit and scope of the present invention.

In the above embodiment, the case 11 of the first joint part 2A is fixed to the flange part 27*a* of the second joint part 2B, a base end of the first arm 3A is fixed to the case 11 of the second joint part 2B, a tip of the first arm 3A is fixed to the case 11 of the third joint part 2C, the case 11 of the fourth joint part 2D is fixed to the flange part 27*a* of the third joint part 2C, a base end of the second arm 3B is fixed to the flange part 27*a* of the fourth joint part 2D, a tip of the second arm 3B is fixed to the case 11 of the fifth joint part 2E, and the case 11 of the sixth joint part 2F is fixed to the flange part 27*a* of the fifth joint part 2E. In addition, for example, the case 11 of the second joint part 2B may be fixed to the flange part 27*a* of the first joint part 2A, a base end of the first arm 3A may be fixed to the flange part 27*a* of the second joint part 2B, a tip of the first arm 3A may be fixed to the flange part 27*a* of the third joint part 2C, the flange part 27*a* of the fourth joint part 2D may be fixed to the case 11 of the third joint part 2C, a base end of the second arm 3B may be fixed to the case 11 of the fourth joint part 2D, a tip of the second arm 3B may be fixed to the flange part 27*a* of the fifth joint part 2E, and the flange part 27*a* of the sixth joint part 2F may be fixed to the case 11 of the fifth joint part 2E.

In the above embodiment, the rigid internal gear 16 serves as an output shaft of the reduction gear 8, but the flexible external gear 17 may serve as an output shaft of the reduction gear 8. In this case, the rigid internal gear 16 is fixed to the case 11 and the inner ring 19*a* of the cross roller bearing 19, and the flexible external gear 17 is fixed to the outer ring 19*b* of the cross roller bearing 19 and the flange part 27*a* of the output-side member 27. In addition, in the above embodiment, the reduction gear 8 is a hollow wave gear device, but the reduction gear 8 may be a hollow reduction gear other than the hollow wave gear device. In addition, the reduction gear 8 may be a reduction gear other than the hollow reduction gear. In addition, in the above embodiment, the motor 7 is a hollow motor, but the motor 7 may be a motor other than the hollow motor.

In the above embodiment, the robot 1 includes six joint parts 2, but the number of joint parts 2 included in the robot 1 may be 5 or less or 7 or more. In addition, in the above embodiment, the robot 1 includes two arms 3, but the number of arms 3 included in the robot 1 may be 1 or 3 or more. In addition, in the above embodiment, the wiring 60 is drawn inside the joint part 2 and the arm 3, but the wiring 60 may be drawn to the outside of the joint part 2 and the arm 3. In addition, in the above embodiment, the flange part 27*a* is formed on the output-side member 27, but the flange part 27*a* may not be formed on the output-side member 27 as long as the arm 3 and the case 11 can be fixed to the output-side member 27. In addition, in the above embodiment, the robot 1 is an industrial robot, but the robot 1 can be applied for various applications. For example, the robot 1 may be a service robot.

The invention claimed is:

1. A robot comprising:
a joint part; and
an arm,
wherein the joint part includes a motor, a reduction gear connected to the motor, an output-side member fixed to an output shaft of the reduction gear, a position detection mechanism configured to detect a rotational position of the motor, a circuit board to which the motor and the position detection mechanism are electrically connected, and a case in which the motor, the reduction gear, the position detection mechanism, and the circuit board are housed,
wherein the motor and the reduction gear are fixed to the case, and
wherein a motor driving circuit configured to drive the motor, a signal transmission circuit configured to output a signal that is inputted to the circuit board to the outside of the circuit board, and a connector to which an end of a wiring is connected are mounted on the circuit board,
wherein the motor includes a rotation shaft in a cylindrical shape, a driving magnet in a cylindrical shape and fixed to an outer circumferential surface of the rotation shaft, and a stator disposed on an outer circumferential side of the driving magnet,
wherein an outer circumferential surface of the stator is fixed to the case,
wherein an end side part of an input shaft of the reduction gear is inserted into and fixed to an inner circumferential side of a part of the rotation shaft where the driving magnet is fixed thereto,
wherein the end side part of the input shaft is fixed to the rotation shaft by bonding.

2. The robot according to claim 1,
wherein the motor is a hollow motor having a hollow rotation shaft, and
wherein the reduction gear is a hollow reduction gear which has the hollow input shaft connected to the rotation shaft and is disposed coaxially with the motor.

3. The robot according to claim 2,
wherein the joint part includes a cylindrical tubular member inserted into an inner circumferential side of the rotation shaft and the input shaft,
wherein a through-hole that communicates with an inner circumferential side of the tubular member is formed at the output-side member, and
wherein an opening that opens in a direction orthogonal to an axial direction of the output shaft is formed in the case.

4. The robot according to claim 3,
wherein the output-side member includes a flange part that is formed in an annular shape and disposed outside the case.

5. The robot according to claim 4,
wherein the joint part includes a first joint part, a second joint part, a third joint part, a fourth joint part, a fifth joint part, and a sixth joint part, the arm includes a first arm and a second arm, and a support member fixed to the flange part of the first joint part is provided, wherein at least two connectors including a first connector and a second connector are mounted as the connector on at least the circuit board of the second joint part, the circuit board of the third joint part, the circuit board of the fourth joint part, and the circuit board of the fifth joint part, wherein the first joint part and the second joint part are connected so that an axial direction of the output shaft of the first joint part and an axial direction of the output shaft of the second joint part are perpendicular to each other, and the case of the first joint part is fixed to the flange part of the second joint part, wherein the second joint part and the first arm are connected so that an axial direction of the output shaft of the second joint part and a longitudinal direction of the first arm are perpendicular to each other, and a base end of the first arm is fixed to the case of the second joint part, wherein the first arm and the third joint part are connected so that the longitudinal direction of the first arm and an axial direction of the output shaft of the third joint part are perpendicular to each other, and a tip of the first arm is fixed to the case of the third joint part, wherein the third joint part and the fourth joint part are connected so that the axial direction of the output shaft of the third joint part and an axial direction of the output shaft of the fourth joint part are perpendicular to each other, and the case of the fourth joint part is fixed to the flange part of the third joint part, wherein the fourth joint part and the second arm are connected so that the axial direction of the output shaft of the fourth joint part coincides with a longitudinal direction of the second arm, and a base end of the second arm is fixed to the flange part of the fourth joint part, wherein the second arm and the fifth joint part are connected so that the longitudinal direction of the second arm and an axial direction of the output shaft of the fifth joint part are perpendicular to each other, and a tip of the second arm is fixed to the case of the fifth joint part, wherein the fifth joint part and the sixth joint part are connected so that the axial direction of the output shaft of the fifth joint part and an axial direction of the output shaft of the sixth joint part are perpendicular to each other, and the case of the sixth joint part is fixed to the flange part of the fifth joint part, wherein one end of the wiring drawn out from the case of the sixth joint part is connected to the connector of the sixth joint part and the other end thereof is connected to the first connector of the fifth joint part, wherein one end of the wiring drawn out from the case of the fifth joint part is connected to the second connector of the fifth joint part, and the other end thereof is connected to the first connector of the fourth joint part, wherein one end of the wiring drawn out from the case of the fourth joint part is connected to the second connector of the fourth joint part and the other end thereof is connected to the first connector of the third joint part, wherein one end of the wiring drawn out from the case of the third joint part is connected to the second connector of the third joint part and the other end thereof is connected to the first connector of the second joint part, and wherein one end of the wiring drawn out from the case of the second joint part is connected to the second connector of the second joint part and the other end thereof is connected to the connector of the first joint part.

6. The robot according to claim 2, wherein the output-side member includes a flange part that is formed in an annular shape and disposed outside the case.

7. The robot according to claim 6, wherein the joint part includes a first joint part, a second joint part, a third joint part, a fourth joint part, a fifth joint part, and a sixth joint part, the arm includes a first arm and a second arm, and a support member fixed to the flange part of the first joint part is provided, wherein at least two connectors including a first connector and a second connector are mounted as the connector on at least the circuit board of the second joint part, the circuit board of the third joint part, the circuit board of the fourth joint part, and the circuit board of the fifth joint part, wherein the first joint part and the second joint part are connected so that an axial direction of the output shaft of the first joint part and an axial direction of the output shaft of the second joint part are perpendicular to each other, and the case of the first joint part is fixed to the flange part of the second joint part, wherein the second joint part and the first arm are connected so that an axial direction of the output shaft of the second joint part and a longitudinal direction of the first aim are perpendicular to each other, and a base end of the first arm is fixed to the case of the second joint part, wherein the first aim and the third joint part are connected so that the longitudinal direction of the first arm and an axial direction of the output shaft of the third joint part are perpendicular to each other, and a tip of the first arm is fixed to the case of the third joint part, wherein the third joint part and the fourth joint part are connected so that the axial direction of the output shaft of the third joint part and an axial direction of the output shaft of the fourth joint part are perpendicular to each other, and the case of the fourth joint part is fixed to the flange part of the third joint part, wherein the fourth joint part and the second arm are connected so that the axial direction of the output shaft of the fourth joint part coincides with a longitudinal direction of the second arm, and a base end of the second arm is fixed to the flange part of the fourth joint part, wherein the second arm and the fifth joint part are connected so that the longitudinal direction of the second arm and an axial direction of the output shaft of the fifth joint part are perpendicular to each other, and a tip of the second arm is fixed to the case of the fifth joint part, wherein the fifth joint part and the sixth joint part are connected so that the axial direction of the output shaft of the fifth joint part and an axial direction of the output shaft of the sixth joint part are perpendicular to each other, and the case of the sixth joint part is fixed to the flange part of the fifth joint part, wherein one end of the wiring drawn out from the case of the sixth joint part is connected to the connector of the sixth joint part and the other end thereof is connected to the first connector of the fifth joint part, wherein one end of the wiring drawn out from the case of the fifth joint part is connected to the second connector of the fifth joint part, and the other end thereof is connected to the first connector of the fourth joint part, wherein one end of the wiring drawn out from the case of the fourth joint part is connected to the second connector of the fourth joint part and the other end thereof is connected to the first connector of the third joint part, wherein one end of the wiring drawn out from the case of the third joint part is connected to the second connector of the third joint part and the other end thereof is connected to the first connector of the second joint part, and wherein one end of the wiring drawn out from the case of the second joint part is connected to the second connector of the second joint part and the other end thereof is connected to the connector of the first joint part.

8. The robot according to claim 1,
wherein the output-side member includes a flange part that is formed in an annular shape and disposed outside the case.

9. The robot according to claim 8,
wherein the joint part includes a first joint part, a second joint part, a third joint part, a fourth joint part, a fifth joint part, and a sixth joint part, the arm includes a first arm and a second arm, and a support member fixed to the flange part of the first joint part is provided, wherein at least two connectors including a first connector and a second connector are mounted as the connector on at least the circuit board of the second joint part, the circuit board of the third joint part, the circuit board of the fourth joint part, and the circuit board of the fifth joint part, wherein the first joint part and the second joint part are connected so that an axial direction of the output shaft of the first joint part and an axial direction of the output shaft of the second joint part are perpendicular to each other, and the case of the first joint part is fixed to the flange part of the second joint part, wherein the second joint part and the first arm are connected so that an axial direction of the output shaft of the second joint part and a longitudinal direction of the first arm are perpendicular to each other, and a base end of the first arm is fixed to the case of the second joint part, wherein the first arm and the third joint part are connected so that the longitudinal direction of the first arm and an axial direction of the output shaft of the third joint part are perpendicular to each other, and a tip of the first arm is fixed to the case of the third joint part, wherein the third joint part and the fourth joint part are connected so that the axial direction of the output shaft of the third joint part and an axial direction of the output shaft of the fourth joint part are perpendicular to each other, and the case of the fourth joint part is fixed to the flange part of the third joint part, wherein the fourth joint part and the second arm are connected so that the axial direction of the output shaft of the fourth joint part coincides with a longitudinal direction of the second arm, and a base end of the second arm is fixed to the flange part of the fourth joint part, wherein the second arm and the fifth joint part are connected so that the longitudinal direction of the second arm and an axial direction of the output shaft of the fifth joint part are perpendicular to each other, and a tip of the second arm is fixed to the case of the fifth joint part, wherein the fifth joint part and the sixth joint part are connected so that the axial direction of the output shaft of the fifth joint part and an axial direction of the output shaft of the sixth joint part are perpendicular to each other, and the case of the sixth joint part is fixed to the flange part of the fifth joint part, wherein one end of the wiring drawn out from the case of the sixth joint part is connected to the connector of the sixth joint part and the other end thereof is connected to the first connector of the fifth joint part, wherein one end of the wiring drawn out from the case of the fifth joint part is connected to the second connector of the fifth joint part, and the other end thereof is connected to the first connector of the fourth joint part, wherein one end of the wiring drawn out from the case of the fourth joint part is connected to the second connector of the fourth joint part and the other end thereof is connected to the first connector of the third joint part, wherein one end of the wiring drawn out from the case of the third joint part is connected to the second connector of the third joint part and the other end thereof is connected to the first connector of the second joint part, and wherein one end of the wiring drawn out from the case of the second joint part is connected to the second connector of the second joint part and the other end thereof is connected to the connector of the first joint part.

* * * * *